United States Patent
Aiso et al.

(10) Patent No.: US 10,793,937 B2
(45) Date of Patent: Oct. 6, 2020

(54) STEEL FOR INDUCTION HARDENING

(71) Applicant: NIPPON STEEL & SUMITOMO METAL CORPORATION, Tokyo (JP)

(72) Inventors: Toshiharu Aiso, Villavägen Uppsala (SE); Suguru Yoshida, Hokkaido (JP); Kei Miyanishi, Hokkaido (JP)

(73) Assignee: NIPPON STEEL CORPORATION, Tokyo (JP)

( * ) Notice: Subject to any disclaimer, the term of this patent is extended or adjusted under 35 U.S.C. 154(b) by 710 days.

(21) Appl. No.: 15/120,440

(22) PCT Filed: Feb. 20, 2015

(86) PCT No.: PCT/JP2015/054766
§ 371 (c)(1),
(2) Date: Aug. 19, 2016

(87) PCT Pub. No.: WO2015/125915
PCT Pub. Date: Aug. 27, 2015

(65) Prior Publication Data
US 2017/0067140 A1    Mar. 9, 2017

(30) Foreign Application Priority Data

Feb. 24, 2014 (JP) .................................. 2014-033352

(51) Int. Cl.

| | |
|---|---|
| *C22C 38/60* | (2006.01) |
| *C21D 1/42* | (2006.01) |
| *C22C 38/00* | (2006.01) |
| *C22C 38/02* | (2006.01) |
| *C21D 8/02* | (2006.01) |
| *C22C 38/40* | (2006.01) |
| *C22C 38/18* | (2006.01) |
| *C22C 38/08* | (2006.01) |
| *C21D 1/10* | (2006.01) |
| *C22C 38/04* | (2006.01) |
| *C22C 38/06* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/32* | (2006.01) |
| *C21D 9/30* | (2006.01) |
| *C21D 9/32* | (2006.01) |
| *B22D 11/22* | (2006.01) |
| *C21D 9/40* | (2006.01) |
| *B22D 11/16* | (2006.01) |
| *C21D 6/00* | (2006.01) |
| *C22C 38/42* | (2006.01) |

(52) U.S. Cl.
CPC ............... *C22C 38/60* (2013.01); *C21D 1/10* (2013.01); *C21D 1/42* (2013.01); *C21D 8/02* (2013.01); *C21D 8/0247* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/18* (2013.01); *C22C 38/22* (2013.01); *C22C 38/24* (2013.01); *C22C 38/26* (2013.01); *C22C 38/28* (2013.01); *C22C 38/32* (2013.01); *C22C 38/40* (2013.01); *B22D 11/16* (2013.01); *B22D 11/22* (2013.01); *C21D 6/002* (2013.01); *C21D 6/005* (2013.01); *C21D 6/008* (2013.01); *C21D 9/30* (2013.01); *C21D 9/32* (2013.01); *C21D 9/40* (2013.01); *C21D 2211/004* (2013.01); *C22C 38/42* (2013.01); *Y02P 10/253* (2015.11)

(58) Field of Classification Search
CPC ...................................................... C22C 38/60
See application file for complete search history.

(56) References Cited

U.S. PATENT DOCUMENTS

| | | |
|---|---|---|
| 2011/0002807 A1 | 1/2011 | Saitoh et al. |
| 2013/0048156 A1 | 2/2013 | Hashimura et al. |
| 2013/0101457 A1 | 4/2013 | Aiso et al. |

FOREIGN PATENT DOCUMENTS

| | | | |
|---|---|---|---|
| CN | 1701128 | A | 11/2005 |
| CN | 1802446 | A | 7/2006 |
| JP | 2004-27334 | A | 1/2004 |
| JP | 2007-131871 | A | 5/2007 |
| JP | 2007-197810 | A | 8/2007 |
| JP | 4659139 | B2 | 3/2011 |
| JP | 2012-219334 | A | 11/2012 |
| JP | 2012-219335 | A | 11/2012 |
| JP | 2012-251184 | A | 12/2012 |
| WO | WO 2010/082454 | A1 | 7/2010 |
| WO | WO 2012/008405 | A1 | 1/2012 |

OTHER PUBLICATIONS

Machine translation of JP2012-219335 A (Japanese document published Nov. 12, 2012.*

(Continued)

*Primary Examiner* — Christopher S Kessler
(74) *Attorney, Agent, or Firm* — Birch, Stewart, Kolasch & Birch, LLP (57) ABSTRACT

A steel for induction hardening according to an aspect includes, as a chemical composition, predetermined amounts of alloy elements and a remainder including Fe and impurities, in which Al×N is 0.000330 to 0.000825, Mn/S is 4.6 to 14.0, a machinability index M is 15.5 to 25.65, an area fraction of AlN having an equivalent circle diameter of more than 200 nm at a ¼ position of a diameter of the steel is 20% or less of an area fraction of all AlN having an equivalent circle diameter of 40 nm or more, and a number density of Mn sulfide-based inclusions having a maximum diameter of 0.3 μm or more and 10 μm or less at the ¼ position of the diameter is 100 pieces/mm² or more and 2500 pieces/mm² or less.

11 Claims, 1 Drawing Sheet

(56) References Cited

OTHER PUBLICATIONS

Office Action dated Mar. 16, 2017, in Chinese Patent Application No. 201580009760.1, with partial English translation.
Extended European Search Report dated Sep. 19, 2017, in European Patent Application No. 15752609.6.
Hiroshi Yaguchi, "Factors Influencing Machinability of Free-machining Steels", Heat treatment, vol. 41, No. 4, 2001, pp. 190-195.
International Search Report for PCT/JP2015/054766 dated May 19, 2015.
Masakazu Hayaishi et al., "The effect of sulfide morphologies on the machinability of shape-controlled-sulfide free machining steel", CAMP-ISIJ, vol. 15, 2002, p. 583.
Written Opinion of the International Searching Authority for PCT/JP2015/054766 (PCT/ISA/237) dated May 19, 2015.

* cited by examiner

STEEL FOR INDUCTION HARDENING

TECHNICAL FIELD OF THE INVENTION

The present invention relates to a steel for induction hardening having excellent machinability, and particularly to a steel which is appropriately applicable to induction hardening and is used in power transmission components (for example, gears, bearings, CVT sheaves, and shafts) for vehicles, construction machines, agricultural machines, windmills for power generation, industrial machines and the like.

Priority is claimed on Japanese Patent Application No. 2014-033352, filed on Feb. 24, 2014, the content of which is incorporated herein by reference.

RELATED ART

Hitherto, power transmission components such as gears have been widely used after being subjected to a surface hardening treatment. As a surface hardening method, carburizing, nitriding, induction hardening, and the like are employed. Among the methods, "carburizing" is for the purpose of increasing the carbon level of only the surface layer of a material so as to be hardened while maintaining the toughness of the central portion of the material. The carburizing treatment is mainly for the purpose of improving fatigue strength and is applied to the materials such as gears and components of CVTs and CVJs for vehicles. However, the carburizing treatment method that has been widely employed these days requires batch processing in a gas atmosphere, and the batch processing requires that a component temperature is held at, for example, about 930° C. for several hours or longer. Therefore, high energy and costs are consumed in the carburizing treatment. In addition, in an actual operation, in addition to problems such as a tendency toward environmental destruction due to a treatment of carburizing materials, there is also a problem of a difficulty in achieving an in-line system.

In order to solve these problems, there has been research conducted for obtaining desired strength properties only by an induction hardening treatment. This is because the induction hardening treatment requires a shorter time for surface hardening treatment and lower energy consumption compared to the carburizing treatment, and is thus very advantageous in reducing environmental burdens. However, in order to obtain a required surface hardness through the induction hardening treatment, there is a problem in that the C content of a steel provided for the induction hardening treatment (steel for induction hardening) has to be increased. In a case of increasing the C content of the steel, the machinability of the steel before induction hardening is deteriorated.

As the steel that is used in a case of producing components after being carburized, so-called case hardening steel having a C content of 0.18 mass % to 0.23 mass % such as JIS SCr420 or case hardening steel having a C content of about 0.2% such as JIS SCM420 has been used. The biggest reason that the steel having a low C content, such as case hardening steel, is used as the material of a component is to ensure machinability. The hardness of the case hardening steel having a low C content is low and thus the machinability of the case hardening steel is high. Therefore, in a case where a production method including a carburizing process is applied to case hardening steel, machining of shapes can be easily performed before carburizing, and the surface hardness is enhanced after carburizing, thereby obtaining a component having high strength.

However, in order to enable a component subjected to induction hardening to obtain an appropriate surface hardness, the C content of the steel itself has to be at least 0.4% or higher. In this case, the hardness of the steel is increased before cutting, resulting in a deterioration in machinability. In order to replace carburizing with induction hardening, a steel which has good machinability is required, even when the C content is increased and thus the steel is hardened. That is, in a case where there is an attempt to use induction hardening to produce a component that has been produced using carburizing in the related art, the biggest problem is the machinability of the steel.

The related art regarding a steel for induction hardening is described as follows. Patent Document 1 is the invention regarding a steel for induction hardening and discloses a steel in which the Si content is limited to 0.50% or less, the Al content is limited to 0.10% or less, and the area fraction of martensite in a structure before induction hardening is controlled to be 70% or higher. In this method, the strength of the steel after the induction hardening is significantly improved. However, the workability, particularly machinability of the steel of Patent Document 1 before induction hardening is low.

Patent Document 2 proposes a steel for induction hardening having excellent machinability. Patent Document 2 discloses a technique in which the average aspect ratio of ferrite grains and the intergranular distance of the ferrite grains are controlled to be within specific ranges by appropriately controlling the area fractions of ferrite, pearlite, and bainite, and the addition of specific amounts of Al and B is necessary, thereby improving machinability. However, the steel of Patent Document 2 has a small ferrite area fraction and thus has high internal hardness. Internal hardness does not change before and after induction hardening, and thus the steel having high internal hardness has high hardness during cutting work before induction hardening. Since there is a high possibility that steel having high hardness may cause breakage such as chipping of a tool during cutting, it is thought that cutting conditions to which the steel disclosed in Patent Document 2 can be applied are limited and there may be cases where productivity is degraded.

Patent Document 3 proposes a technique for improving the machinability of a steel for induction hardening by increasing an Al content. However, in Patent Document 3, a comparison between the machinability of the steel of the invention and the machinability of case hardening steel is not performed. Therefore, it is unclear whether or not good machinability to the same extent as that of case hardening steel can be obtained using the technique disclosed in Patent Document 3.

PRIOR ART DOCUMENT

Patent Document

[Patent Document 1] Japanese Unexamined Patent Application, First Publication No. 2007-131871

[Patent Document 2] Japanese Unexamined Patent Application, First Publication No. 2012-219334

[Patent Document 3] Japanese Patent No. 4659139

Non-Patent Document

[Non-Patent Document 1] "Material factors on machinability of free cutting steel", by Hiroshi Yaguchi, heat treatment Vol. 41 No. 4, P 193

[Non-Patent Document 2] "The effect of sulfide morphologies on the machinability of shape-controlled-sulfide free machining steel" by Hayaishi Masakazu, et al., CAMP-ISIJ, Vol. 15, (2002), P 583

DISCLOSURE OF THE INVENTION

Problems to be Solved by the Invention

An object of the present invention is to provide a steel for induction hardening which solves the defects of the inventions of the related art described above and exhibits excellent machinability and high surface hardness after induction hardening. Particularly, an object is to provide a steel for induction hardening which is appropriate for replacing a carburizing treatment, which is included in a production process of components used as power transmission components (for example, gears, bearings, CVT sheaves, and shafts) for vehicles, construction machines, agricultural machines, windmills for power generation, and industrial machines, with an induction hardening treatment, and has excellent machinability.

Means for Solving the Problem

The inventors conducted intensive research to solve the problems. First, particularly focusing on Al and S, which are considered to have significant effects on machinability, the research was conducted through literature reviews and experiments.

Regarding S, the following (a) is described in Non-Patent Documents 1 and 2. In addition, regarding Al, the following (b) is described in Patent Document 3.

(a) By including S in steel, the machinability of the steel is improved. This is because in a case of including S in the steel, voids that are generated at the interfaces between Mn sulfide-based inclusions (hereinafter, sometimes referred to as MnS inclusions) and the primary phase cause stress concentration at cutting shear regions (regions that undergo shear deformation due to cutting) and thus an effect of reducing cutting energy can be obtained. In many cases, the adhesion of MnS inclusions onto a tool is not observed. Therefore, it is thought that an effect for improving machinability obtained by including S is mainly caused by the formation of voids.

The effect of the size of MnS inclusions on machinability will be described below. Machinability expressed in VL1000 as an index typically increases as the average particle size of MnS inclusions increases. It is thought that this is because voids are more easily generated at the interface between the MnS inclusions and the primary phase in the cutting shear region as the MnS inclusions increase in size.

(b) In a case where Al is present in steel in a solid solution state, solid soluted Al and oxygen react with each other during cutting and a hard coating of Al oxides is formed on a tool. This coating suppresses the wear of the tool. Therefore, Al contained in the steel significantly improves the service life of the tool used to cut the steel.

As described above, it is thought that in order to improve the machinability of the steel, it is effective to promote the generation of voids in the cutting shear region by increasing the size of the MnS inclusions in the steel and to suppress the wear of the tool by adding Al to the steel and forming the coating of Al oxides on the tool. However, the machinability of the steel for induction hardening cannot be sufficiently improved only by these techniques. In order to obtain sufficient surface hardness after induction hardening, it is required that the C content of the steel for induction hardening is 0.40 mass % or more. In the above-described technique, the machinability of the steel containing 0.40 mass % or more of C cannot be sufficiently improved. The inventors further repeated various experiments and obtained the following knowledge.

(A) By including both Al and S, machinability is significantly improved. The combined effect of Al and S is not a simple addition of the effect for improving machinability by the MnS inclusions and the effect for improving machinability by Al. The inventors found that in a case where a coating of Al oxides is present on a tool, when a predetermined amount of S is further contained, the adhesion of MnS inclusions onto the tool is promoted. In a case where both Al and S are contained in steel, in addition to an effect of forming the coating of Al oxides on the tool by Al and suppressing the wear of the tool, a combined effect of Al and S, that is, an effect of promoting the adhesion of the MnS inclusions onto the tool by the coating of Al oxides can also be obtained. By the combined effect, lubricity at the interface between the tool and chips can be significantly increased. The inventors discovered the above-described combined effect by minutely inspecting the tool after cutting using SEM-EDS, AES, TEM-EDS, or the like. Furthermore, the inventors also found that the combined effect cannot be sufficiently obtained even when both Al and S are contained in the steel for the following reason (B).

(B) In the case where both Al and S are contained in the steel, in contrast to the typical case described in (a), the machinability of the steel is improved as the average particle size of the MnS inclusions in the steel decreases. This is because the number density of the MnS inclusion increases as the average particle size of the MnS inclusions decreases, and thus the number of contact points of the MnS inclusions and the tool increases, resulting in the enhancement of the lubricity improving effect of the MnS inclusions. As described in (A), in the steel containing both Al and S, lubricity applied to the interface between the tool and chips, other than the generation of voids in a cutting shear region, is the main cause of a machinability improving mechanism by the MnS inclusions. In a case where the MnS inclusions are small in size, a stress concentration effect is small. Therefore, the effect for improving machinability based on the generation of voids is suppressed. On the other hand, in the case where the size of the MnS inclusions is small, the number density of MnS inclusions per corresponding amount of MnS increases, and thus the frequency of contact points between the tool and the MnS inclusions increases, thereby improving the lubricity at the interface between the tool and the chips.

As described above, by including both Al and S and refining MnS, the coating of Al oxides can be formed on the tool to suppress the wear of the tool, and the lubricity at the interface between the tool and the steel can be improved, thereby significantly improving machinability. These items found by the inventors are techniques that are not present in the related art.

Furthermore, the inventors found that the refinement of MnS is achieved by controlling the cooling rate during casting and controlling the ratios of Mn and S.

In addition, the inventors found that in a case where an Al content is increased in order to improve machinability, coarse AlN is likely to be generated in the steel and this coarse AlN reduces the service life of a cutting tool and degrades the machinability of the steel. The inventors found that the number of coarse AlN can be decreased and the machinability of the steel can be improved by setting the product of the Al content and the N content in the steel to be within appropriate ranges and performing a solutionizing treatment on the steel before hot rolling of the steel.

Moreover, the inventors examined a method to enable the machinability of a steel for induction hardening to which this technique is applied to be as high as that of case hardening steel. As a result, the inventors found that a steel for induction hardening having machinability to the same or higher extent than that of case hardening steel can be obtained by controlling the chemical composition of the steel to satisfy the following Expression (3) in addition to employing the above-described technique.

$$15.5 \leq (-1.40 \times Al + 0.0175) \times (214 \times (C + (1/7) \times Si + (1/5) \times Mn + (1/9) \times Cr) - 211) \leq 25.65 \quad (3)$$

where Al, C, Si, Mn, and Cr indicate the contents (mass %) of the corresponding elements in steel.

The present invention has been completed on the basis of the above-described knowledge. That is, the gist of the present invention is as follows.

(1) According to an aspect of the present invention, a steel for induction hardening includes, as a chemical composition, by mass %: C: 0.40% to 0.60%; Si: 0.01% to 1.4%; Mn: 0.2% to less than 1.0%; Cr: 0.01% to less than 0.5%; Al: 0.11% to 0.17%; S: more than 0.03% to 0.07%; N: 0.0030% to 0.0075%; P: less than 0.05%; B: 0% to 0.005%; Mo: 0% to 0.2%; Ni: 0% to 1.0%; Cu: 0% to 1.0%; Ca: 0% to 0.005%; Mg: 0% to 0.005%; Zr: 0% to 0.005%; Rem: 0% to 0.005%; Ti: 0% to 0.2%; Nb: 0% to 0.2%; V: 0% to 0.35%; Sb: 0% to 0.015%; Te: 0% to 0.2%; Pb: 0% to 0.5%; Bi: 0% to 0.5%; and a remainder includes Fe and impurities, in which the chemical composition satisfies Expressions (A) to (C), at a ¼ position of a diameter of the steel, an area fraction of AlN having an equivalent circle diameter of more than 200 nm is 20% or less of an area fraction of all AlN having an equivalent circle diameter of 40 nm or more, and at the ¼ position of the diameter of the steel, a number density of Mn sulfide-based inclusions having a maximum diameter of 0.3 μm or more and 10 μm or less is 100 pieces/mm² or more and 2500 pieces/mm² or less.

$$0.000330 \leq Al \times N \leq 0.000825 \quad (A)$$

$$4.6 \leq Mn/S \leq 14.0 \quad (B)$$

$$15.5 \leq (-1.40 \times Al + 0.0175) \times (214 \times (C + (1/7) \times Si + (1/5) \times Mn + (1/9) \times Cr) - 211) \leq 25.65 \quad (C)$$

where the symbols "C", "Si", "Mn", "Cr", "Al", "N", and "S" included in Expression (A), Expression (B), and Expression (C) respectively indicate amounts of C, Si, Mn, Cr, Al, N, and S by unit mass %.

(2) The steel for induction hardening described in (1) may further include, as the chemical composition, by mass %, one or two or more of B: 0.0003% to 0.005%, Mo: 0.01% to 0.2%, Ni: 0.05% to 1.0%, and Cu: 0.05% to 1.0%.

(3) The steel for induction hardening described in (1) or (2) may further include, as the chemical composition, by mass %, one or two or more of Ca: 0.0003% to 0.005%, Mg: 0.0003% to 0.005%, Zr: 0.0003% to 0.005%, and Rem: 0.0003% to 0.005%.

(4) The steel for induction hardening described in any one of (1) to (3) may further include, as the chemical composition, by mass %, one or two or more of Ti: 0.005% to 0.2%, Nb: 0.005% to 0.2%, and V: 0.005% to 0.35%.

(5) The steel for induction hardening described in any one of (1) to (4) may further include, as the chemical composition, by mass %, one or two or more of Sb: 0.0003% to 0.015%, Te: 0.0003% to 0.2%, Pb: 0.01% to 0.5%, and Bi: 0.01% to 0.5%.

Effects of the Invention

According to the present invention, a steel for induction hardening which has excellent machinability and exhibits excellent surface hardness after induction hardening can be provided. Accordingly, a steel for induction hardening used for producing power transmission components through induction hardening instead of carburizing can be provided.

EMBODIMENTS OF THE INVENTION

First, the reason for limiting the content of each alloy element in the chemical composition of a steel for induction hardening according to an embodiment will be described. Hereinafter, the symbol "%" indicates "mass %" if not particularly defined in the description of the reason for limiting the contents of the alloy elements.

(C: 0.40% to 0.60%)

C is an element which is included in the steel to ensure the strength of steel and the surface hardness of the steel after induction hardening. In a case where the C content is less than 0.40%, the above-described effects are not obtained. However, in a case where the C content is more than 0.60%, the toughness of the steel is deteriorated. Furthermore, in the case where the C content is more than 0.60%, the hardness of the steel is increased, and machinability and workability during forging and the like are also significantly deteriorated. Therefore, the C content is set to 0.40% to 0.60%. In order to stably obtain the above-described effects, the lower limit of the C content is preferably set to 0.45%, 0.50%, or 0.55%.

(Si: 0.01% to 1.4%)

Si is an element which contributes to deoxidizing during steel production and contributes to improving the strength of the steel. In a case where the Si content is less than 0.01%, the deoxidizing effect and the strength improving effect described above cannot be obtained. On the other hand, in a case where the Si content is more than 1.4%, the toughness and ductility of the steel are deteriorated. Moreover, in the case where the Si content is more than 1.4%, hard inclusions are generated in the steel, resulting in deterioration in the machinability of the steel. Therefore, the Si content is set to 0.01% to 1.4%. The lower limit of the Si content is preferably 0.05%, 0.10%, or 0.15%, and the upper limit of the Si content is preferably 0.7%, 0.4%, or 0.3%.

(Mn: 0.2% to less than 1.0%)

Mn has an effect for increasing the hardenability of the steel and is thus an effective element to obtain a martensitic structure during induction hardening. In order to obtain this effect, it is necessary that 0.2% or more of Mn is included in the steel. In addition, a portion of the included Mn forms MnS and improves the machinability of the steel. In order to obtain this effect, it is necessary that Mn is included to satisfy the following Expression (2) as described later. On the other hand, in a case where 1.0% or more of Mn is included in the steel, the hardness of the steel increases, the toughness of the steel is deteriorated, and machinability and workability during forging and the like are significantly deteriorated. Therefore, it is necessary that the Mn content is within a range of 0.2% to less than 1.0%. The lower limit of the Mn content is preferably 0.3%, 0.35%, or 0.4%, and the upper limit of the Mn content is preferably 0.9%, 0.7%, or 0.5%.

(Cr: 0.01% to less than 0.5%)

Cr has an effect of improving the hardenability of the steel. Furthermore, Cr imparts resistance to temper softening to the steel and accordingly improves the fatigue strength of the steel. In a case where the Cr content is less than 0.01%, these effects cannot be obtained. On the other hand, in a case where the Cr content is 0.5% or more, Cr carbides are generated and the steel become embrittled. In addition, in the case where the Cr content is 0.5% or more, Cr is concentrated into cementite and the cementite is stabilized. Accordingly, fusion of the carbides to austenite during induction hardening is impeded, and the hardness of a hardened layer becomes uneven. Therefore, it is necessary that the amount of Cr is 0.01% to less than 0.5%. The lower limit of the Cr content is preferably 0.05% or 0.1%, and the upper limit of the Cr content is preferably 0.4%, 0.3%, or 0.2%.

(Al: 0.11% to 0.17%)

Al is an element effective in deoxidizing the steel. Furthermore, as described above, Al is an element which significantly improves the machinability the steel by being included simultaneously with S. In a case where the Al content is less than 0.11%, the amount of Al oxides generated on the tool during cutting is small, and a sufficient coating of Al oxides for suppressing the wear of the tool cannot be obtained. On the other hand, in a case where the Al content is more than 0.17%, not only the effect for improving machinability is saturated, but also coarse Al-based inclusions are likely to be generated in the steel, resulting in a deterioration in machinability or fatigue strength. Therefore, the Al content is set to 0.11% to 0.17%. The lower limit of the Al content is preferably 0.12% or 0.13%, and the upper limit of the Al content is preferably 0.16%, 0.15%, or 0.14%.

(S: more than 0.03% to 0.07%)

S binds to Mn to form MnS, and has an effect for improving machinability in proportion to the amount thereof. In addition, as described above, by simultaneously including Al and S, MnS is adhered onto the tool and the lubricity of the surface of the tool is improved, thereby significantly improving machinability. In order to sufficiently obtain these effects, it is necessary that more than 0.03% of S is included in the steel. On the other hand, in a case where more than 0.07% of S is included, an excessive amount of MnS that is formed acts as a path of propagation of fatigue cracks, resulting in a significant deterioration in the fatigue strength, toughness, and the like of the steel. Therefore, it is necessary that the S content is within a range of more than 0.03% to 0.07%. The lower limit of the S content is preferably 0.035%, 0.040%, or 0.045%, and the upper limit of the S content is preferably 0.060%, 0.055%, or 0.050%.

(N: 0.0030% to 0.0075%)

N binds to Al, V, and the like in the steel to form nitrides and/or carbonitrides. These nitrides and/or carbonitrides have a function of suppressing grain growth by enabling pinning of austenite grain boundaries and thus preventing coarsening of a structure. In order to obtain these effects, it is necessary that 0.0030% or more of N is included in the steel. On the other hand, when N is excessively included in the steel in a proportion of more than 0.0075%, the ductility of the steel in a high temperature range of 1000° C. or higher is deteriorated. The deterioration in ductility causes a reduction in yield during continuous casting and rolling of the steel. In addition, coarse AlN degrades the machinability of the steel. Therefore, it is necessary that the N content is set to 0.0030% to 0.0075%. The lower limit of the N content is appropriately 0.0035%, 0.0040%, or 0.0045%, and the upper limit of the N content is appropriately 0.0070%, 0.0065%, or 0.0060%.

(P: less than 0.05%)

P is contained as an impurity and is segregated at the austenite grain boundaries to cause embrittlement of prior austenite grain boundaries, thereby causing boundary cracking. Therefore, it is preferable that the P content is reduced as much as possible. Therefore, it is preferable that the amount of P is set to be within a range of less than 0.05%. Since it is not necessary to include P in order to solve the problems of the steel according to the embodiment, the lower limit of the P content is not particularly limited. However, excessive costs are required to limit the amount of P to 0.001% or less. Therefore, the lower limit of the P content is appropriately 0.001%, 0.002%, or 0.005%. The upper limit of the P content is appropriately 0.04%, 0.03%, or 0.025%.

The steel according to the embodiment exhibits appropriate effects by including the above-described basic elements in the chemical composition thereof. In addition, in a case of including one or two or more selected from the following elements in addition to the above-mentioned basic elements, the properties of the steel are further improved.

(One or two of B: 0% to 0.005%, Mo: 0% to 0.2%, Ni: 0% to 1.0%, and Cu: 0% to 1.0%)

B may not be included in the steel. Therefore, the lower limit of the amount thereof is 0%. On the other hand, the steel according to the embodiment may contain B as necessary. Solid soluted B in austenite has an effect of significantly improving the hardenability of the steel even when a minute amount of B is included in the steel. Therefore, B is an effective element to obtain a martensitic structure during induction hardening. In order to stably obtain this effect, the steel according to the embodiment may contain 0.0003% or more of B. On the other hand, in a case where more than 0.005% of B is included, the above-described effect is saturated. Therefore, in a case of including B, it is preferable that the B content is within a range of 0.0003% to 0.005%. The lower limit of the B content is appropriately 0.0005%, 0.0010%, or 0.0015%, and the upper limit of the B content is appropriately 0.004%, 0.003%, or 0.0025%. In addition, the amount of solid soluted B is reduced by N having a function of forming BN. On the other hand, Ti forms TiN to fix N, and accordingly prevents a reduction in the amount of solid soluted B. In a case of including B, it is preferable that Ti is simultaneously included in the steel in order to stably ensure the amount of solid soluted B.

Mo, Ni, and Cu may not be included in the steel. Therefore, the lower limit of the contents thereof is 0%. On the other hand, all of Mo, Ni, and Cu are elements that improve strength. In order to stably obtain this effect, the steel according to the embodiment may contain one or more of 0.01% or more of Mo, 0.05% or more of Ni, and 0.05% or more of Cu. The lower limit of the Mo content is preferably 0.02%, 0.03%, or 0.05%, the lower limit of the Ni content is preferably 0.10%, 0.15%, or 0.20%, and the lower limit of the Cu content is preferably 0.10%, 0.15%, or 0.20%.

In a case where the Mo content is more than 0.2%, the hardenability of the machinability is increased too significantly, and bainite or martensite-austenite constituents are generated in the steel before induction hardening, resulting in a deterioration in the machinability of the steel for induction hardening. Therefore, the Mo content is set to 0.2% or less, and is preferably set to 0.1% or less. In a case where the Ni content is more than 1.0% or in a case where the Cu content is more than 1.0%, as in a case where the Mo content is excessive, the hardenability of the steel is increased too significantly, and bainite or martensite-austenite constituents are generated in the steel before induction hardening, resulting in a deterioration in the machinability of the steel for induction hardening. Therefore, the upper limit of the Ni content is 1.0%, and preferably 0.9%, 0.8%, or 0.7%. The upper limit of the Cu content is 1.0%, and preferably 0.9%, 0.8%, or 0.7%.

(One or two or more of Ca: 0% to 0.005%, Mg: 0% to 0.005%, Zr: 0% to 0.005%, and Rem: 0% to 0.005%)

Ca, Mg, Zr, and Rem (rare earth elements) may not be included in the steel. Therefore, the lower limit of the contents thereof is 0%. On the other hand, all of Ca, Mg, Zr, and Rem are elements that contribute to improving the mechanical properties of the steel by controlling the morphology of MnS in the steel. In order to stably obtain these effects, the steel according to the embodiment may contain one or more of 0.0003% or more of Ca, 0.0003% or more of Mg, 0.0003% or more of Zr, and 0.0003% or more of Rem. On the other hand, in a case where one or more of the Ca content, the Mg content, the Zr content, and the Rem content in the steel are more than 0.005%, oxides contained in the steel are coarsened, resulting in a deterioration in the fatigue strength of the steel. Therefore, the upper limit of each of the amounts of Ca, Mg, Zr, and Rem is 0.005%, and preferably 0.003%, 0.002%, or 0.001%. In addition, Rem indicates rare earth elements and one or more selected from Sc, Y, La, Ce, Pr, Nd, Pm, Sm, Eu, Gd, Tb, Dy, Ho, Er, Tm, Yb, and Lu. The amount of Rem is the total amount of Sc, Y, La, Ce, Pr, Nd, Pm, Sm, Eu, Gd, Tb, Dy, Ho, Er, Tm, Yb, and Lu.

(One or two or more of Ti: 0% to 0.2%, Nb: 0% to 0.2%, and V: 0% to 0.35%)

Ti and Nb may not be included in the steel. Therefore, the lower limit of the contents thereof is 0%. On the other hand, Ti and Nb contribute to homogenization of the structure by suppressing abnormal growth of grains. In order to stably obtain this effect, the steel according to the embodiment may contain one or more of 0.005% or more of Ti and 0.005% or more of Nb. The lower limit of the Ti content is preferably 0.010%, 0.050%, or 0.10%, and the lower limit of the Nb content is preferably 0.010%, 0.050%, or 0.10%.

On the other hand, in a case where the Ti content and/or the Nb content is more than 0.2%, hard carbides are generated in the steel, resulting in a deterioration in the machinability of the steel. Therefore, both of the Ti content and the Nb content are 0.2% or less. The upper limit of the Ti content is preferably 0.18%, 0.15%, or 0.13%, and the upper limit of the Nb content is preferably 0.18%, 0.15%, or 0.13%.

V forms fine carbides, nitrides, and/or carbonitrides with C and/or N to prevent coarsening of grains and thus contributes to homogenization of the structure. In order to obtain this effect, the steel according to the embodiment may contain 0.005% or more of V. The lower limit of the V content is preferably 0.01%, 0.05%, or 0.10%. On the other hand, in a case where the V content is more than 0.35%, hard and coarse carbides are generated in the steel, and thus the machinability of the steel is deteriorated. Therefore, the V content is set to 0.35% or less. The V content is preferably less than 0.20% or equal to or less than 0.15%.

(One or two or more of Sb: 0% to 0.015%, Te: 0% to 0.2%, Pb: 0% to 0.5%, and Bi: 0% to 0.5%)

Sb, Te, Pb, and Bi may not be included in the steel. Therefore, the lower limit of the contents thereof is 0%. On the other hand, Sb, Te, Pb, and Bi are elements that improve machinability. In order to stably obtain this effect, the steel according to the embodiment may contain one or more of 0.0003% or more of Sb, 0.0003% or more of Te, 0.01% or more of Pb, and 0.01% or more of Bi. The lower limit of the Sb content is preferably 0.0005%, 0.0008%, or 0.001%, the lower limit of the Te content is preferably 0.0005%, 0.0008%, or 0.001%, the lower limit of the Pb content is preferably 0.02%, 0.03%, or 0.05%, and the lower limit of the Bi content is preferably 0.02%, 0.03%, or 0.05%.

On the other hand, in a case where the Sb content is more than 0.015%, in a case where the Te content is more than 0.2%, in a case where the Pb content is more than 0.5%, and/or in a case where the Bi content is more than 0.5%, hot brittleness is exhibited, thus causes fissure or a difficulty in rolling. Therefore, the Sb content is set to 0.015% or less, the Te content is set to 0.2% or less, the Pb content is set to 0.5% or less, and the Bi content is set to 0.5% or less. The upper limit of the Sb content is preferably 0.012%, 0.010%, or 0.008%, the upper limit of the Te content is preferably 0.1%, 0.05%, or 0.02%, the upper limit of the Pb content is preferably 0.4%, 0.3%, or 0.2%, and the upper limit of the Bi content is preferably 0.4%, 0.3%, or 0.2%.

(Remainder: Fe and Impurities)

The remainder of the chemical composition of the steel for induction hardening according to the embodiment is and impurities. In addition, there may be cases where impurities are incorporated into the steel depending on the circumstances such as raw materials, materials, and production facilities. However, incorporation of impurities is allowed within a range that does not impede the properties of the steel for induction hardening according to the embodiment.

Next, the reasons for limitation regarding Expression (1) to (3), the reason for limiting the area fraction of AlN having an equivalent circle diameter of more than 200 nm to 20% or less of the area fraction of all AlN having an equivalent circle diameter of 40 nm or more, and the reason for limiting the number density of Mn sulfide-based inclusions having a maximum diameter of 0.3 μm or more and 10 μm or less included in the steel to 100 pieces/mm$^2$ or more and 2500 pieces/mm$^2$ or less will be described.

(Area Fraction of AlN Having Equivalent Circle Diameter of More Than 200 nm is 20% or Less of Area Fraction of All AlN Having Equivalent Circle Diameter of 40 nm or More at Position which is ¼ of Diameter)

In a case of increasing the Al content in order to improve the machinability, AlN having an equivalent circle diameter of more than 200 nm is likely to be generated in the steel. Hereinafter, there may be cases where "AlN having an equivalent circle diameter of more than 200 nm" is referred to as "coarse AlN". In a case where coarse AlN is present in the steel, mechanical wear of a cutting tool significantly occurs due to the coarse AlN, and the effect for improving machinability by the coating of Al oxides formed by Al contained in the steel is lost. The inventors found by investigating the relationship between the amount of coarse AlN and machinability that in a case where the area fraction of coarse AlN at a ¼ position of the diameter of the steel is more than 20% of the area fraction of all AlN having an equivalent circle diameter of 40 nm or more, machinability desired by the steel for induction hardening according to the embodiment cannot be obtained. In addition, AlN having an equivalent circle diameter of less than 40 nm as low as the detection limit is present only in a slight proportion with respect to the area fraction of all AlN and is thus not considered when the relationship between the amount of coarse AlN and machinability is investigated. Therefore, it is necessary that at the ¼ position of the diameter of the steel for induction hardening according to the embodiment, the area fraction of AlN having an equivalent circle diameter of more than 200 nm is 20% or less of the area fraction of all AlN having an equivalent circle diameter of 40 nm or more. The area fraction of AlN having an equivalent circle diameter of more than 200 nm is preferably 15% or less, 10% or less, or 5% or less of the area fraction of all AlN having an equivalent circle diameter of 40 nm or more.

In a case where the shape of a transverse section of the steel is substantially circular, the ¼ position of the diameter is referred to as the middle portion of the radius in the transverse section of the steel, that is, a ¼ portion of the diameter. There may be cases where the configuration of the surface layer portion of the steel and the configuration of the central portion of the steel are slightly different from each other due to the difference in cooling rate or the like. Since the ¼ position of the diameter of the steel, is positioned between the surface layer portion of the steel and the central portion of the steel, the configuration at the position which is ¼ of the diameter of the steel is close to the average of the entire configuration of the steel. Regarding the steel according to the embodiment, control of the amount of coarse AlN is performed on the ¼ position of the diameter of the steel. In addition, control of the amount of Mn sulfide-based inclusions, which will be described later, is also performed on the ¼ position of the diameter of the steel for the above reason.

($0.000330 \leq Al \times N \leq 0.000825$)

The generation of coarse AlN can be suppressed by reducing the Al content and/or the N content. However, in the steel for induction hardening according to the embodiment, Al has an effect for improving machinability, and N has an effect of refining the structure. In a case of reducing the Al content and the N content in order to suppress the generation of coarse AlN, there is concern that these effects cannot be obtained. The inventors found that in order to suppress the generation of coarse AlN while maintaining the effects of Al and N, it is necessary to define the range to be satisfied by the chemical composition of the steel for induction hardening according to the embodiment as Expression (1) and to allow a heating temperature before hot working of the steel to be 1200° C. or higher.

$$0.000330 \leq Al \times N \leq 0.000825 \quad (1)$$

where the symbols "Al" and "N" included in Expression (1) respectively indicate the contents of Al and N by unit mass %.

In order to reduce the amount of coarse AlN in the steel at the time of cutting work, it is necessary to solutionize AlN during heating in a hot working process performed before the cutting work. The inventors thought that solutionizing of AlN is associated with the product (Al×N) of the Al content and the N content of the steel and the heating temperature during hot working and conducted the following experiment.

Various steels which included, as the chemical composition, C: 0.44% to 0.46%, Si: 0.23% to 0.26%, Mn: 0.78% to 0.82%, P: 0.013% to 0.016%, S: 0.045% to 0.06%, Al: 0.11% to 0.17%, N: 0.0030% to 0.0075%, and a remainder including Fe and impurities and had different Al×N values were melted, then were forged into a diameter of 65 mm, heated to 1200° C., and thereafter air-cooled. Various samples obtained therefrom were examined to observe AlN. Observation of AlN was performed by a replica method of a transmission electron microscope, and the area fraction of AlN was obtained as follows. First, 20 or more of sample sectional photographs were taken in a visual field of 1000 $\mu m^2$ at a magnification of 40,000 times. Photographing was performed according to the replica method of the transmission electron microscope, and the above-mentioned sample sectional photographs were obtained by putting together a plurality of images. A position where a photograph is taken for obtaining the area fraction of AlN was set to a ¼ position of the diameter (65 mm) of a steel bar. In addition, the area fraction of AlN having an equivalent circle diameter of more than 200 nm and the area fraction of all AlN having an equivalent circle diameter of 40 nm or more regarding each sample sectional photograph were obtained, and furthermore, the ratio of the area fraction of AlN having an equivalent circle diameter of more than 200 nm to the area fraction of all AlN having an equivalent circle diameter of 40 nm or more regarding each sample sectional photograph was obtained by an expression of "(the area fraction of AlN having an equivalent circle diameter of more than 200 nm/the area fraction of all AlN having an equivalent circle diameter of 40 nm or more)×100". The average value of the ratios of the area fraction of AlN having an equivalent circle diameter of more than 200 μm to the area fraction of all AlN having an equivalent circle diameter of 40 nm or more regarding the sample sectional photographs was regarded as the ratio of area fraction of AlN having an equivalent circle diameter of more than 200 nm to the area fraction of all AlN having an equivalent circle diameter of 40 nm or more in the sample.

From the result, it was found that the area fraction of AlN having an equivalent circle diameter of more than 200 nm is enabled to be 20% or less of the area fraction of all AlN having an equivalent circle diameter of 40 nm or more by causing Al×N to be 0.000825 or less and causing the heating temperature before starting the hot working to be 1200° C. or higher. The upper limit of Al×N is preferably 0.000800, 0.000750, or 0.000700. The lower limit of Al×N is not particularly specified and may be set to 0.000330 using the lower limits of Al and N. The preferable lower limit of Al×N may be calculated from the preferable lower limits of Al and N.

(Number Density of Mn Sulfide-based Inclusions having Maximum Diameter of 0.3 μM or More and 10 μm or Less Included in Steel is 100 pieces/mm² or More and 2500 pieces/mm² or Less at Position which is ¼ of Diameter)

MnS inclusions are inclusions that improve the machinability. As in the steel for induction hardening according to the embodiment, in a case of improving the machinability by using the combined effect of Al and S, it is necessary to increase the number of MnS inclusions by refining the size of MnS inclusions. Specifically, in order to sufficiently obtain the combined effect of Al and S, it is necessary that the number density of MnS inclusions having a maximum diameter of 0.3 μm or more and 10 μm or less is 100 pieces/mm² or more and 2500 pieces/mm² or less. Hereinafter, there may be cases where "MnS inclusion having a maximum diameter of 0.3 μm or more and 10 μm or less" is referred to as "fine MnS inclusion". The maximum diameter of an inclusion is the major axis of the inclusion recognized when the section of the steel is observed. In a case where the number density of fine MnS inclusions is less than 100 pieces/mm$^2$, the effect for improving machinability caused by including both Al and S cannot be sufficiently obtained. The lower limit of the number density of the fine MnS inclusions is preferably 300 pieces/mm$^2$, and more preferably 500 pieces/mm$^2$. There is no need to specify the upper limit of the number density of the fine MnS inclusions. However, when the number density of the fine MnS inclusions is more than 2500 pieces/mm$^2$, the effect for improving machinability by the fine MnS inclusions is saturated. The upper limit of the number density of the fine MnS inclusion may be 2500 pieces/mm$^2$, 1500 pieces/mm$^2$, or 1000 pieces/mm$^2$.

In order to enable the number density of the fine MnS inclusions to be 100 pieces/mm$^2$ or more and 2500 pieces/mm$^2$ or less, it is necessary to control the cooling rate and control the ratio between the Mn content and the S content.

The number density of the fine MnS inclusions may be obtained, for example, as follows. A longitudinal section of the steel bar is polished, 60 photographs in a visual field of 110 μm×75 μm are taken by using an optical microscope at a magnification of 1000 times, the photographs are subjected to image analysis, and the average of the number densities of the fine MnS inclusions regarding each photograph is obtained. A point where the 60 photographs are taken to obtain the number density of the fine MnS inclusions was set to ¼ position of the diameter of the steel.

In addition, an inclusion that is primarily formed of MnS and contains a material other than MnS (for example, an inclusion that is primarily formed of MnS and contains a sulfide of Fe, Ca, Ti, Zr, Mg, Rem, or the like, which is coexistent with MnS in a solutionized and/or bound state, an inclusion that is primarily formed of MnS and contains a compound of an element other than S and Mn, such as MnTe, which is coexistent with MnS in a solutionized and/or bound state, or the inclusion that is precipitated at an oxide as a nucleus) has the same effect for improving machinability as that of the inclusion formed of only MnS. Therefore, the above-mentioned "MnS inclusions" include "the inclusion formed of only MnS" and "the inclusion that is primarily formed of MnS and contains a material other than MnS" and may be referred to as "Mn sulfide-based inclusions". The chemical formula of the Mn sulfide-based inclusion may be expressed as "(Mn, X)(S, Y)" (X: an element that forms a sulfide other than Mn, Y: an element that is bound to Mn other than S).

$$4.6 \le Mn/S \le 14.0$$

In order to enable the number density of the fine MnS inclusions to be 100 pieces/mm$^2$ or more and 2500 pieces/mm$^2$ or less, it is necessary to control the ratio between the Mn content and the S content. Typically, MnS inclusions are generated in a temperature range in which the steel becomes a liquid phase. The MnS inclusions generated in a liquid phase are likely to grow and become coarse. On the other hand, the inventors obtained the knowledge that a temperature at which MnS inclusions are generated is significantly reduced by controlling the ratio between the Mn content and the S content and thus enabling Mn/S to be 14.0 or less, the amount of the MnS inclusions generated in a temperature range in which the steel becomes a solid phase is sufficiently increased, and accordingly the combined effect of Al and S can be sufficiently obtained. The MnS inclusions precipitated in the solid phase are less likely to grow, and as a result, finely dispersed MnS inclusions can be obtained. On the other hand, Mn/S has a significant effect on the hot ductility of the steel. Typically, it is known that in a case where Mn/S is less than 4.6, S that has not been bound to Mn forms FeS, and FeS deteriorates hot ductility, resulting in a significant degradation in manufacturability. Therefore, as shown in the following Expression (2), Mn/S is set to 4.6 to 14.0. By controlling Mn/S to be within the range, the MnS inclusions can be finely dispersed. The lower limit of Mn/S is preferably 5.0, 5.2, or 5.5, and the upper limit of Mn/S is preferably 12.0, 10.0, or 8.0. In Expression (2), "Mn" is the amount (mass %) of Mn, and "S" is the amount (mass %) of S.

$$4.6 \le Mn/S \le 14.0 \tag{2}$$

In addition, in order to enable the MnS inclusions to be finely dispersed in the steel, during casting of the steel, the cooling rate between the liquidus temperature (the temperature at which solidification starts when molten steel is cooled) and the solidus temperature (the temperature at which solidification ends when molten steel is cooled) at a point in a ¼ thickness of the slab may be controlled to be 10° C./min to 100° C./min. The point in a ¼ thickness indicates, in a case where the sectional shape of a slab (slab transverse section) in a direction perpendicular to a casting direction is quadrangular, the middle portion between the surface of the slab and the center of the slab on the center line of the width of the slab, that is, ¼ portion in a thickness of the slab. In this definition, the long side of the slab transverse section is defined as the width of the slab, and the short side of the slab transverse section is defined as the thickness of the slab. In a case where the slab transverse section is circular, the ¼ point in a thickness indicates the middle portion of the radius in the slab transverse section, that is, a diameter ¼ portion.

In order to cause the MnS inclusions to be finely dispersed, it is necessary to control crystallization and precipitation of MnS. In order to perform this control, it is necessary to strictly control the cooling rate of the slab. In a case where the cooling rate between the liquidus temperature and the solidus temperature at the point in a ¼ thickness is 10° C./min or less, the solidification rate becomes too low, and the crystallized MnS inclusions becomes coarse. Therefore, the MnS inclusions cannot be finely dispersed. In a case where the cooling rate between the liquidus temperature and the solidus temperature at the point in a ¼ thickness is 100° C./min or more, the number density of the generated fine MnS inclusions is saturated, and there is an increased risk of initiating cracks in the slab due to an increase in the hardness of the slab. By controlling the size of a mold section, a casting speed, and the like to be appropriate values, an appropriate cooling rate can be obtained. This control method can be applied to a case where casting is performed in any of a continuous casting method and an ingot-making method.

The cooling rate in a range between the liquidus temperature and the solidus temperature at the point in a ¼ thickness of the slab can be obtained using an average secondary dendrite arm spacing λ of the solidified structure at the point in a ¼ thickness of the slab after the casting and before hot working and the following Expression 4.

$$Rc = (\lambda/770)^{-1/0.41} \tag{4}$$

where Rc is the cooling rate (in the unit of ° C./min) at the point in a ¼ thickness of the slab in a range between the liquidus temperature and the solidus temperature, and λ is the average secondary dendrite arm spacing (in the unit of μm) at the point in a ¼ thickness of the slab. Rc can be confirmed by measuring λ using Expression (4). In a case where λ is 300 μm, Rc is about 10° C./min, and in a case where λ is 117 μm, Rc is about 100° C./min. Therefore, by producing the slab such that the chemical composition of the slab satisfies Expression 2 described above and λ of the slab is 117 μm to 300 μm, the slab in which the number density of fine MnS inclusions is 100 pieces/mm² to 2500 pieces/mm² can be obtained. In addition, by performing hot working on the slab, steel in which the number density of fine MnS inclusions is 100 pieces/mm² to 2500 pieces/mm² can be obtained. For example, λ can be measured by a method described in "Journal of the Japan Institute of Metals and Materials" Vol. 33 (1969), P 658-663, (Akira Suzuki, Yutaka Nagaoka).

$$(15.5 \leq (-1.40 \times Al + 0.0175) \times (214 \times (C + (1/7) \times Si + (1/5) \times Mn + (1/9) \times Cr) - 211) \leq 25.65)$$

In the chemical composition of the steel for induction hardening according to the embodiment, the C content, the Si content, the Mn content, the Cr content, and the Al content in the steel satisfy Expression (3).

$$15.5 \leq (-1.40 \times Al + 0.0175) \times (214 \times (C + (1/7) \times Si + (1/5) \times Mn + (1/9) \times Cr) - 211) \leq 25.65 \quad (3)$$

where "C", "Si", "Mn", "Cr", and "Al" included in Expression (3) respectively indicate the amounts of C, Si, Mn, Cr, and Al by unit mass %.

In order to further increase the effect for improving machinability by Al, it is necessary to optimize the relationship between the amount of Al and a carbon equivalent Ceq.

It is widely known that the machinability of the steel is significantly affected by the hardness of the steel. Here, the inventors investigated the following two correlations.

(a1) the correlation between the hardness and the carbon equivalent that has a significantly effect on the hardness (a2) the correlation between the hardness and the machinability that is affected by the hardness The carbon equivalent Ceq of the steel is defined by using Expression (5) focusing on the amounts of C, Si, Mn, and Cr that have an effect on the hardness.

$$Ceq = C + (1/7) \times Si + (1/5) \times Mn + (1/9) \times Cr \quad (5)$$

The relationship between the hardness and the carbon equivalent was investigated as follows.

A plurality of hot rolled steel bars having a diameter of 65 mm which contained C: 0.40% to 0.60%, Si: 0.01% to 1.4%, Mn: 0.2% to less than 1.0%, S: more than 0.03% to 0.07%, P: less than 0.05%, N: 0.0030% to 0.0075%, Al: 0.03% to 0.17%, Cr: 0.01% to less than 0.5%, and a remainder including Fe and impurities, and had various chemical components that satisfy Al×N: 0.000330 to 0.000825 and Mn/S: 4.6 to 14.0 were prepared. The hot rolled steel bars were held at 900° C. for 1 hour, were thereafter air-cooled, and were cut in a direction perpendicular to the rolling direction. During air cooling, a thermocouple was buried into a position at a depth of 5 mm from the surface of the steel bar and was welded thereto, and an average cooling rate between 900° C. and 500° C. during air cooling was controlled by using the thermocouple. Accordingly, the average cooling rate between 900° C. and 500° C. was set to 0.3° C./s to 0.9° C./s. All the structure of the steel bar after the air cooling was a ferrite-pearlite structure. In addition, the amount of coarse AlN and the amount of fine Mn sulfide-based inclusions in the steel bar after the air cooling were within the ranges specified above. The sections of the samples perpendicular to the rolling direction were polished, and thereafter the Vickers hardness of the section at a position, which was ¼ of the diameter, was measured. As a result, it was found that the relationship between the Ceq of the steel and the hardness (HV) of the steel before hardening can be approximated by the following Expression (a1) with good accuracy.

$$\text{Hardness } (HV) \text{ before hardening} = 214 \times Ceq + 49 \quad (a1)$$

The relationship between the hardness and the machinability was investigated as follows. A cutting test was conducted on square test pieces of 40 mm×40 mm×250 mm, which were cut from the steel bars in which the Al content varies within a range of 0.03% to 0.17%, using a fly tool in order to simulate hobbing of a gear. A cutter used in a hobbing process during production of an actual product has a plurality of cutting edges. In contrast, the fly tool is a cutter having only a single hobbing edge. It was confirmed that the machinability (amount of tool wear) obtained by conducting a machinability test using the hobbing cutter which has the plurality of cutting edges and the machinability (amount of tool wear) obtained by conducting a cutting test using the fly tool have a good correspondence relationship. Therefore, the fly tool is used to conduct the cutting test instead of the hobbing cutter. For example, a test method conducted through cutting using the fly tool is described in "TOYOTA Technical Review" Vol. 52, No. 2, December 2002, P78. Table 1 shows test conditions.

[Table 1]

By measuring the maximum rake face wear depth of the tool (crater wear depth) using a stylus type profilometer, the cutting amount (cutting distance (m)) of the tool was obtained until the tool wear amount reached 70 μm (that is, until the end of the tool service life). In a case where JIS SCr420 (an Al content of 0.03 mass %), which is typically used as the material of a carburized gear, was cut under the conditions shown in Table 1, the cutting distance was 15.5 m. Therefore, when the cutting distance of a test sample is 15.5 m or more under the same condition, the machinability can be evaluated as good.

Figure 1:
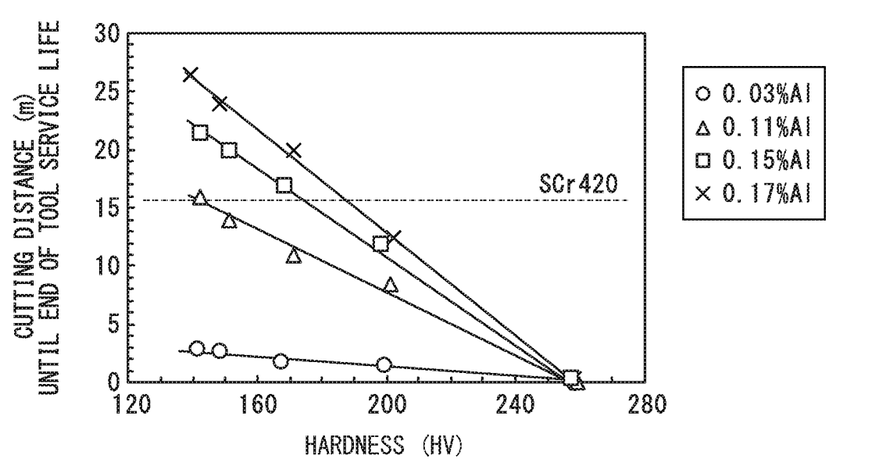
FIG. 1 is a diagram showing the relationship between the hardness (HV) of a steel and the cutting distance (m) until the end of the service life of a tool, which represents the machinability of the steel, and an effect of the Al content in the steel on the relationship.

FIG. 1 shows the relationship between the hardness and the cutting distance of the steel. As illustrated in FIG. 1, the inventors found that although the machinability is improved as the Al content increases, the hardness dependence of the machinability increases when Al is included in the steel. From this result, it was found that the relationship between the cutting distance, the amount of Al, and the hardness is approximated by Expression (6) with good accuracy in a case where the amount of coarse AlN and the amount of fine Mn sulfide-based inclusions are within the ranges specified above. This is also new knowledge that was never known in the related art.

$$\text{Cutting distance } (m) = (-1.40 \times Al + 0.0175) \times (\text{hardness } (HV) - 260) \quad (6)$$

That is, the inventors found that when the hardness (HV) of the steel and the amount of Al satisfy the relationship of the following Expression (a2), excessively excellent machinability to the same or higher extent than that of SCr420 can be ensured.

$$(-1.40 \times Al + 0.0175) \times (\text{hardness } (HV) - 260) \geq 15.5 \quad (a2)$$

The following Expression (3) can be obtained from Expressions (a1) and (a2) described above, and the chemical composition of the steel for induction hardening according to the embodiment.

$$15.5 \leq (-1.40 \times Al + 0.0175) \times (214 \times (C + (1/7) \times Si + (1/5) \times Mn + (1/9) \times Cr) - 211) \leq 25.65 \quad (3)$$

Hereinafter, there may be cases where a value M obtained by an expression of "M=(−1.40×Al+0.0175)×(214×(C+(1/7)×Si+(1/5)×Mn+(1/9)×Cr)−211)" is referred to as a machinability index M. Excellent machinability can be obtained by optimizing the machinability index M. The upper limit of the machinability index M is set to 25.65 on the basis of the upper and lower limits of the C content in the steel (C by mass % in the expression, which is applied in the same manner hereinafter), the Si content in the steel (Si in the expression), the Mn content in the steel (Mn in the expression), the Cr content in the steel (Cr in the expression), and the Al content in the steel (Al in the expression). That is, in the ranges of the chemical composition of the steel for induction hardening according to the embodiment, the C content, the Si content, the Mn content, the Cr content, and the Al content that maximize the machinability index M are respectively 0.40%, 0.01%, 0.2%, 0.01%, and 0.17%, and the value obtained by putting these values in the expression that defines the machinability index M becomes $(-1.40 \times Al + 0.0175) \times (214 \times (C + (1/7) \times Si + (1/5) \times Mn + (1/5) \times Cr) - 211) = 25.65$ (here, rounded to two decimal places). Therefore, 25.65 is determined as the upper limit of the machinability index M. In addition, the hardness of the steel before hardening, which satisfies the specification of each alloy component of the steel for induction hardening according to the embodiment and the specification of the machinability index M typically becomes about 145 Hv to about 190 Hv.

A method of producing the steel for induction hardening according to the embodiment includes a process of casting molten steel which contains, by mass %, C: 0.40% to 0.60%, Si: 0.01% to 1.4%, Mn: 0.2% to less than 1.0%, Cr: 0.01% to less than 0.5%, Al: 0.11% to 0.17%, S: more than 0.03% to 0.07%, N: 0.0030% to 0.0075%, P: less than 0.05%, B: 0% to 0.005%, Mo: 0% to 0.2%, Ni: 0% to 1.0%, Cu: 0% to 1.0%, Ca: 0% to 0.005%, Mg: 0% to 0.005%, Zr: 0% to 0.005%, Rem: 0% to 0.005%, Ti: 0% to 0.2%, Nb: 0% to 0.2%, V: 0% to 0.35%, Sb: 0% to 0.015%, Te: 0% to 0.2%, Pb: 0% to 0.5%, Bi: 0% to 0.5%, and a remainder including Fe and impurities and has a chemical composition that satisfies the above Expressions (1) to (3) to enable the cooling rate in a range between the liquidus temperature and the solidus temperature at a ¼ portion in a thickness direction of a slab to be 10° C./min to 100° C./min, a process of heating the slab to 1200° C. or higher, and a process of performing hot working on the slab. The method of producing the steel for induction hardening according to the embodiment may further include a process of normalizing the steel after the hot working process.

As described above, in the casting process, in a case where the cooling rate in the range between the liquidus temperature and the solidus temperature at the ¼ portion in the thickness direction of the slab is less than 10° C./min, the number density of Mn sulfide-based inclusions having a maximum diameter of 0.3 μm or more and 10 μm or less included in the steel becomes less than 100 pieces/mm², resulting in a deterioration in the machinability of the steel. In a case where the cooling rate in the range between the liquidus temperature and the solidus temperature at the ¼ portion in the thickness direction of the slab is more than 100° C./min, there is concern that cracking may occur in the slab. As described above, in a case where the heating temperature of the slab in the heating process is less than 1200° C., a solutionizing treatment of AlN in the slab is not sufficiently performed, and the area fraction of AlN having an equivalent circle diameter of more than 200 nm in the steel becomes more than 20% of the area fraction of all AlN having an equivalent circle diameter of 40 nm or more, resulting in a deterioration in the machinability of the steel. After the hot working process and the normalizing process, it is preferable to slowly cool the steel so as not to deteriorate the machinability. For example, after the hot working process and the normalizing process, it is preferable to air-cool the steel so as to enable an average cooling rate between 900° C. and 500° C. to be 0.3° C./s to 0.9° C./s. Normalizing conditions may be within typical ranges according to the technical field to which the steel for induction hardening according to the embodiment belongs. For example, in the normalizing process, the heating temperature may be set to 900° C., and the holding time may be set to 1 hour.

Since the steel for induction hardening according to the embodiment contains 0.40 mass % or more of C, in a case where induction hardening is performed on the steel for induction hardening according to the present invention under appropriate conditions, a steel having a surface hardness of 600 Hv or more can be obtained. In addition, in the steel for induction hardening according to the embodiment, the chemical composition includes both of 0.11 mass % or more of Al and more than 0.03 mass % of S, the area fraction of coarse AlN is 20% or less of the area fraction of all AlN having an equivalent circle diameter of 40 nm or more, the number density of Mn sulfide-based inclusions having a maximum diameter of 0.3 μm or more and 10 μm or less is 100 pieces/mm² to 2500 pieces/mm², and the machinability index M is 15.5 or more. Therefore, in a case where the steel for induction hardening according to the embodiment is provided for cutting work, machinability to the same or higher extent than that of SCr420, which as a C content of 0.18 mass % to 0.23 mass % can be obtained. Specifically, in a case where a cutting test is conducted on the steel for induction hardening according to the embodiment under the conditions of Table 1, a cutting distance of 15.5 m or longer is achieved.

EXAMPLES

Next, Examples of the present invention will be described. Production conditions of Examples are merely examples of conditions employed to check the operability and effects of the present invention, and the present invention is not limited to the examples of conditions. The present invention may employ various conditions without departing from the gist of the present invention as long as the object of the present invention can be accomplished.

Steels having the chemical compositions shown in Tables 2-1 and 2-2 were melted. During casting of Steels 1 to 28, the cooling rate between the liquidus temperature and the solidus temperature at the ¼ portion in the thickness of the slab was controlled to be 10° C./min to 100° C./min. However, during melting of Steel 29, the cooling rate was set to be less than 10° C./min. The cooling rate during casting of each of the steels shown in Tables 2-1 and 2-2 was estimated on the basis of the average secondary dendrite arm spacing before hot working of each of the steels. After the casting, hot rolling was performed on the slab, thereby obtaining a steel bar having a diameter of 65 mm. The heating temperature before the hot rolling was set to 1250° C. Underlined numerical values in Tables 2-1 and 2-2 are numerical values that are outside of the specified ranges of the present invention.

[Table 2-1]
[Table 2-2]

Next, the steel bar was held at 900° C. for 1 hour and was then air-cooled. Furthermore, a test piece was cut from the steel bar. Before induction hardening, the hardness (Hv) of the test piece and the cutting distance (m) that represents the machinability of the test piece was measured. The hardness of the test piece was measured by polishing a transverse section obtained by cutting the steel bar in a direction perpendicular to the length direction, and measuring the Vickers hardness at a position which is ¼ of the diameter of the transverse section. The cutting distance was measured by conducting a cutting test under the conditions shown in Table 1. The number density of Mn sulfide-based inclusions having a maximum diameter of 0.3 μm or more and 10 μm or less (fine MnS inclusions) was obtained by polishing a longitudinal section of the steel bar, taking 60 photographs in a visual field of 110 μm×75 μm by using an optical microscope at a magnification of 1000 times, allowing the photographs to be subjected to image analysis, and obtaining the average of the number densities of the fine MnS inclusions regarding each photograph. A point where the 60 photographs were taken to obtain the number density of the fine MnS inclusions was set to the ¼ position of the diameter (65 mm) of the steel.

In addition, a cylindrical sample having a diameter of 26 mm and a length of 50 mm was produced from the center of the steel bar having a diameter of 65 mm as the material. Induction hardening was performed on the cylindrical sample under conditions such that an effective case depth specified in JIS G 0559 "Steel-Determination of case depth after flame hardening or induction hardening" became 1.5 mm. Thereafter, tempering was performed thereon at a heating temperature of 160° C. for a holding time of 90 minutes. Thereafter, a transverse section obtained by cutting the induction hardened cylindrical sample in a direction perpendicular to the length direction was polished, the Vickers hardnesses of 5 points under a load of 100 g in a region at a depth of 50 μm from the surface of the cylindrical sample were measured, the average of the Vickers hardnesses was obtained, and the average was determined as the surface hardness of the cylindrical sample. The surface hardness is an index for evaluating the strength of a component in a case where the present invention is particularly used as the material of various components such as a gear.

The evaluation results are shown in Tables 3-1 and 3-2. Underlined numerical values in Table 3 are numerical values that are outside of the specified ranges of the present invention or numerical values that do not reach the target of the present invention. In addition, the structures of Steel Nos. 1 to 29 were ferrite-pearlite structures with a matrix area fraction of 90% or more.

[Table 3-1]
[Table 3-2]

Steel Nos. 1 to 19 are examples of the present invention. In all of the examples of the present invention, the area fraction of AlN having an equivalent circle diameter of more than 200 nm was 20% or less of the area fraction of all AlN having an equivalent circle diameter of 40 nm or more. The cutting distances in the examples of the present invention were 15.5 m (that is, the cutting distance in the examples of the present invention was equal to or longer than that of SCr420), and the surface hardnesses after induction hardening of the examples of the present invention were HV600 or more. That is, the examples of the present invention are steels having sufficient strength properties and sufficient machinability.

On the other hand, Steel Nos. 20 to 29 are comparative examples which are outside of the ranges of the present invention. In Steel No. 20, the C content was insufficient, the surface hardness after induction hardening was less than HV600, and thus the strength was insufficient. In Steel No. 21, the C content was excessive, the hardness before induction hardening was increased, and thus the cutting distance was reduced. In Steel No. 22, the Al content was insufficient, an effect of protecting the tool by formation of a coating of Al oxides was not obtained, and the cutting distance was reduced. In Steel No. 23 having an excessive Al content, the cutting distance was insufficient. In Steel No. 23, the area fraction of AlN having an equivalent circle diameter of more than 200 nm was more than 20% of the area fraction of all AlN having an equivalent circle diameter of 40 nm or more.

In Steel No. 24, the S content was insufficient, the number of fine Mn sulfide-based inclusions was small, and thus the cutting distance was insufficient. In Steel No. 25 in which Al×N was excessive, the cutting distance was insufficient. In Steel No. 25, the area fraction of AlN having an equivalent circle diameter of more than 200 nm was more than 20% of the area fraction of all AlN having an equivalent circle diameter of 40 nm or more. In Steel No. 26, Mn/S was too low, hot ductility was deteriorated, and cracking had occurred during casting. In Steel No. 27, Mn/S was too high, fine Mn sulfide-based inclusions could not be sufficiently obtained, and the cutting distance was reduced. In Steel No. 28, the value of Expression (1) was too low, and the cutting distance was reduced. In Steel No. 29, the cooling rate during casting was too low, fine MnS could not be sufficiently obtained, and the cutting distance was reduced.

INDUSTRIAL APPLICABILITY

As described above, according to the present invention, a steel for induction hardening which has excellent machinability and is appropriately applicable to induction hardening can be provided. Therefore, the present invention has high applicability to mechanical production industries.

TABLE 1

| Cutting conditions | Speed | 150 m/min |
|---|---|---|
| | Feed | 0.12 mm/rev |
| | Shift amount | 1.8 mm |
| | Cutting depth | 4.5 mm |
| | Cutting oil | Absent (dry cutting) |
| Tool | Type | Fly tool (φ90 mm) |
| | Material | High-speed steel (manufactured by Nachi-Fujikoshi) |
| | Coating | TiAlN (rake face is not coated)) |
| Device | | Horizontal machining center |

TABLE 2-1

| Steel No. | Chemical composition (mass %) | | | | | | | |
|---|---|---|---|---|---|---|---|---|
| | C | Si | Mn | P | S | Cr | Al | N |
| 1 | 0.45 | 0.05 | 0.40 | 0.015 | 0.035 | 0.30 | 0.138 | 0.0040 |
| 2 | 0.60 | 0.01 | 0.22 | 0.013 | 0.040 | 0.04 | 0.170 | 0.0041 |
| 3 | 0.40 | 0.25 | 0.50 | 0.018 | 0.070 | 0.15 | 0.140 | 0.0055 |
| 4 | 0.40 | 1.40 | 0.20 | 0.020 | 0.031 | 0.03 | 0.165 | 0.0040 |
| 5 | 0.41 | 0.03 | 0.98 | 0.010 | 0.070 | 0.10 | 0.160 | 0.0045 |
| 6 | 0.43 | 0.10 | 0.50 | 0.007 | 0.036 | 0.49 | 0.150 | 0.0051 |
| 7 | 0.40 | 0.03 | 0.23 | 0.005 | 0.050 | 0.01 | 0.110 | 0.0075 |
| 8 | 0.50 | 0.10 | 0.40 | 0.014 | 0.050 | 0.10 | 0.150 | 0.0040 |
| 9 | 0.53 | 0.05 | 0.41 | 0.010 | 0.045 | 0.11 | 0.160 | 0.0035 |
| 10 | 0.40 | 0.02 | 0.21 | 0.049 | 0.037 | 0.02 | 0.110 | 0.0030 |
| 11 | 0.40 | 0.01 | 0.20 | 0.012 | 0.040 | 0.01 | 0.170 | 0.0040 |
| 12 | 0.45 | 0.07 | 0.41 | 0.017 | 0.045 | 0.10 | 0.169 | 0.0045 |
| 13 | 0.44 | 0.50 | 0.35 | 0.020 | 0.060 | 0.09 | 0.145 | 0.0043 |
| 14 | 0.41 | 1.00 | 0.23 | 0.001 | 0.040 | 0.06 | 0.165 | 0.0044 |
| 15 | 0.49 | 0.30 | 0.30 | 0.010 | 0.052 | 0.10 | 0.149 | 0.0050 |
| 16 | 0.56 | 0.05 | 0.30 | 0.006 | 0.039 | 0.05 | 0.169 | 0.0040 |
| 17 | 0.43 | 0.10 | 0.26 | 0.010 | 0.036 | 0.09 | 0.170 | 0.0038 |
| 18 | 0.49 | 0.10 | 0.30 | 0.014 | 0.050 | 0.10 | 0.139 | 0.0040 |
| 19 | 0.45 | 0.20 | 0.33 | 0.015 | 0.070 | 0.12 | 0.150 | 0.0039 |
| 20 | 0.37 | 0.07 | 0.34 | 0.008 | 0.040 | 0.10 | 0.160 | 0.0041 |
| 21 | 0.65 | 0.01 | 0.20 | 0.015 | 0.041 | 0.01 | 0.170 | 0.0034 |
| 22 | 0.47 | 0.10 | 0.34 | 0.015 | 0.050 | 0.11 | 0.080 | 0.0045 |
| 23 | 0.45 | 0.20 | 0.50 | 0.018 | 0.055 | 0.14 | 0.183 | 0.0037 |
| 24 | 0.50 | 0.12 | 0.30 | 0.010 | 0.030 | 0.07 | 0.150 | 0.0045 |
| 25 | 0.43 | 0.25 | 0.50 | 0.020 | 0.060 | 0.15 | 0.165 | 0.0060 |
| 26 | 0.45 | 0.17 | 0.21 | 0.014 | 0.069 | 0.21 | 0.150 | 0.0040 |
| 27 | 0.42 | 0.20 | 0.70 | 0.034 | 0.047 | 0.23 | 0.160 | 0.0036 |
| 28 | 0.52 | 0.14 | 0.40 | 0.015 | 0.070 | 0.26 | 0.160 | 0.0039 |
| 29 | 0.49 | 0.12 | 0.38 | 0.017 | 0.052 | 0.13 | 0.159 | 0.0045 |

TABLE 2-2

| Steel No. | Chemical composition (mass %) | | | | | | | | | | | | | | |
|---|---|---|---|---|---|---|---|---|---|---|---|---|---|---|---|
| | B | Mo | Ni | Cu | Ca | Mg | Zr | Rem | Ti | Nb | V | Sb | Te | Pb | Bi |
| 1 | | | | | | | | | | | | | | | |
| 2 | | 0.19 | | | | | | | | | | | | | |
| 3 | | | 1.00 | 1.00 | 0.0030 | | | | | | | | | | |
| 4 | | | | | 0.0010 | | | | | | 0.018 | | | | |
| 5 | 0.0015 | 0.05 | | | | | | | 0.025 | | | 0.0010 | | | |
| 6 | | | | | | 0.0010 | 0.0008 | | | | | | | | |
| 7 | | | | | | | | 0.0005 | | | | | | | |
| 8 | 0.0020 | | | | | | | | | | | | | | |
| 9 | | 0.10 | | | | 0.0003 | | | | | 0.05 | | | | |
| 10 | | | 0.10 | 0.10 | | | | | | | | | 0.0010 | | |
| 11 | | | | | | | | | | 0.100 | | | | | |
| 12 | 0.0028 | | | | | | | | 0.170 | | | | | | |
| 13 | | | | | | | | | | | 0.30 | | | | |
| 14 | 0.0010 | | | | 0.0006 | | | | 0.009 | | | | | 0.10 | |
| 15 | | | | | | | | | | | | | | | 0.10 |
| 16 | | | | | | | | | | | | | | | |
| 17 | | | | | | | | | | | | | | | |
| 18 | | | | | | | | | | | | | | | |
| 19 | | | | | | | | | | | | | | | |
| 20 | | | | | | | | | | | | | | | |
| 21 | | | | | | | | | | | | | | | |
| 22 | | | | | | | | | | | | | | | |
| 23 | | | | | | | | | | | | | | | |
| 24 | | | | | | | | | | | | | | | |
| 25 | | | | | | | | | | | | | | | |
| 26 | | | | | | | | | | | | | | | |
| 27 | | | | | | | | | | | | | | | |
| 28 | | | | | | | | | | | | | | | |
| 29 | | | | | | | | | | | | | | | |

TABLE 3-1

| Steel No. | Expression | | | Machinability index M | Average secondary dendrite arm spacing (μ/m) | Cooling rate during casting (° C./min) |
|---|---|---|---|---|---|---|
| | Ceq | Al × N | Mn/S | | | |
| 1 | 0.570 | 0.0005520 | 11.43 | 15.62 | 141 | 63 |
| 2 | 0.650 | 0.0006970 | 5.50 | 15.86 | 159 | 47 |
| 3 | 0.552 | 0.0007700 | 7.14 | 16.56 | 162 | 45 |
| 4 | 0.643 | 0.0006600 | 6.45 | 15.66 | 118 | 98 |
| 5 | 0.621 | 0.0007200 | 14.00 | 16.11 | 143 | 61 |
| 6 | 0.599 | 0.0007650 | 13.89 | 15.95 | 128 | 80 |
| 7 | 0.451 | 0.0008250 | 4.60 | 15.62 | 117 | 99 |
| 8 | 0.605 | 0.0006000 | 8.00 | 15.68 | 152 | 52 |
| 9 | 0.631 | 0.0005600 | 9.11 | 15.67 | 191 | 30 |
| 10 | 0.447 | 0.0003300 | 5.68 | 15.74 | 166 | 42 |
| 11 | 0.443 | 0.0006800 | 5.00 | 25.64 | 130 | 77 |
| 12 | 0.553 | 0.0007605 | 9.11 | 20.30 | 288 | 11 |
| 13 | 0.591 | 0.0006235 | 5.83 | 15.66 | 143 | 61 |
| 14 | 0.606 | 0.0007260 | 5.75 | 17.38 | 141 | 63 |
| 15 | 0.604 | 0.0007450 | 5.77 | 15.62 | 225 | 20 |
| 16 | 0.633 | 0.0006760 | 7.69 | 16.56 | 142 | 62 |
| 17 | 0.513 | 0.0006460 | 7.22 | 22.30 | 206 | 25 |
| 18 | 0.575 | 0.0005560 | 6.00 | 15.56 | 170 | 40 |
| 19 | 0.558 | 0.0005850 | 4.71 | 17.63 | 117 | 100 |
| 20 | 0.459 | 0.0006560 | 8.50 | 23.28 | 128 | 80 |
| 21 | 0.693 | 0.0005780 | 4.88 | <u>13.85</u> | 235 | 18 |
| 22 | 0.565 | 0.0003600 | 6.80 | <u>8.52</u> | 209 | 24 |
| 23 | 0.594 | 0.0006771 | 9.09 | 20.02 | 126 | 83 |
| 24 | 0.585 | 0.0006750 | 10.00 | 16.52 | 136 | 69 |
| 25 | 0.582 | <u>0.0009900</u> | 8.33 | 18.44 | 241 | 17 |
| 26 | 0.539 | 0.0006000 | <u>3.04</u> | 18.41 | 123 | 87 |
| 27 | 0.614 | 0.0005760 | <u>14.89</u> | 16.43 | 118 | 98 |
| 28 | 0.648 | 0.0006293 | 5.71 | <u>14.92</u> | 118 | 98 |
| 29 | 0.598 | 0.0007155 | 7.31 | 17.05 | 369 | <u>6</u> |

TABLE 3-2

| Steel No. | Sulfide-based inclusions Number density of fine Mn sulfide-based inclusions (pieces/mm²) | Properties before hardening Hardness (HV) | Properties before hardening Cutting distance (m) | Properties after hardening Surface hardness (HV) | Remark |
|---|---|---|---|---|---|
| 1 | 412 | 173 | 15.5 | 660 | Examples |
| 2 | 253 | 186 | 15.5 | 780 | |
| 3 | 565 | 169 | 16.5 | 628 | |
| 4 | 200 | 185 | 15.5 | 625 | |
| 5 | 963 | 184 | 16.0 | 635 | |
| 6 | 515 | 175 | 15.5 | 645 | |
| 7 | 1480 | 149 | 15.5 | 620 | |
| 8 | 484 | 175 | 15.5 | 702 | |
| 9 | 456 | 188 | 15.5 | 721 | |
| 10 | 159 | 151 | 15.5 | 630 | |
| 11 | 109 | 148 | 25.5 | 619 | |
| 12 | 443 | 163 | 20.0 | 660 | |
| 13 | 470 | 180 | 15.5 | 657 | |
| 14 | 316 | 175 | 17.0 | 634 | |
| 15 | 319 | 182 | 15.5 | 695 | |
| 16 | 348 | 180 | 16.5 | 750 | |
| 17 | 289 | 164 | 22.0 | 650 | |
| 18 | 398 | 167 | 15.5 | 695 | |
| 19 | 2410 | 168 | 17.7 | 663 | |
| 20 | 389 | 149 | 23.0 | 587 | Comparative Examples |
| 21 | 249 | 197 | 13.5 | 782 | |
| 22 | 373 | 172 | 8.5 | 680 | |
| 23 | 556 | 174 | 13.0 | 661 | |
| 24 | 95 | 176 | 10.0 | 702 | |
| 25 | 589 | 173 | 14.0 | 649 | |
| 26 | | Cracking | | | |
| 27 | 83 | 181 | 13.0 | 640 | |
| 28 | 531 | 189 | 14.5 | 718 | |
| 29 | 75 | 178 | 12.8 | 699 | |

The invention claimed is:

1. A steel for induction hardening comprising, as a chemical composition, by mass %:
C: 0.40% to 0.60%;
Si: 0.01% to 0.4%;
Mn: 0.2% to less than 1.0%;
Cr: 0.01% to less than 0.5%;
Al: 0.11% to 0.17%;
S: more than 0.03% to 0.07%;
N: 0.0030% to 0.0075%;
P: less than 0.05%;
B: 0% to 0.005%;
Mo: 0% to 0.2%;
Ni: 0% to 1.0%;
Cu: 0% to 1.0%;
Ca: 0% to 0.005%;
Mg: 0% to 0.005%;
Zr: 0% to 0.005%;
Rem: 0% to 0.005%;
Ti: 0% to 0.2%;
Nb: 0% to 0.2%;
V: 0% to 0.35%;
Sb: 0% to 0.015%;
Te: 0% to 0.2%;
Pb: 0% to 0.5%;
Bi: 0% to 0.5%; and
a remainder including Fe and impurities,
wherein the chemical composition satisfies Expressions (1) to (3),
at a ¼ position of a diameter of the steel, an area fraction of AlN having an equivalent circle diameter of more than 200 nm is 20% or less of an area fraction of all AlN having an equivalent circle diameter of 40 nm or more, and
at the ¼ position of the diameter of the steel, a number density of Mn sulfide-based inclusions having a maximum diameter of 0.3 μm or more and 10 μm or less is 100 pieces/mm² or more and 2500 pieces/mm² or less:

$$0.000330 \leq Al \times N \leq 0.000825 \quad (1)$$

$$4.6 \leq Mn/S \leq 14.0 \quad (2)$$

$$15.5 \leq (-1.40 \times Al + 0.0175) \times (214 \times (C + (1/7) \times Si + (1/5) \times Mn + (1/9) \times Cr) - 211) \leq 25.65 \quad (3)$$

where the symbols "C", "Si", "Mn", "Cr", "Al", "N", and "S" included in Expression (1), Expression (2), and Expression (3) respectively indicate amounts of C, Si, Mn, Cr, Al, N, and S by unit mass %.

2. The steel for induction hardening according to claim 1, further comprising, as the chemical composition, by mass %,
one or two or more of
B: 0.0003% to 0.005%,
Mo: 0.01% to 0.2%,
Ni: 0.05% to 1.0%, and
Cu: 0.05% to 1.0%.

3. The steel for induction hardening according to claim 1, further comprising, as the chemical composition, by mass %,
one or two or more of
Ca: 0.0003% to 0.005%,
Mg: 0.0003% to 0.005%,
Zr: 0.0003% to 0.005%, and
Rem: 0.0003% to 0.005%.

4. The steel for induction hardening according to claim 1, further comprising, as the chemical composition, by mass %,
one or two or more of
Ti: 0.005% to 0.2%,
Nb: 0.005% to 0.2%, and
V: 0.005% to 0.35%.

5. The steel for induction hardening according to claim 1, further comprising, as the chemical composition, by mass %,
one or two or more of
Sb: 0.0003% to 0.015%,
Te: 0.0003% to 0.2%,
Pb: 0.01% to 0.5%, and
Bi: 0.01% to 0.5%.

6. The steel for induction hardening according to claim 2, further comprising, as the chemical composition, by mass %,
one or two or more of
Ca: 0.0003% to 0.005%,
Mg: 0.0003% to 0.005%,
Zr: 0.0003% to 0.005%, and
Rem: 0.0003% to 0.005%.

7. The steel for induction hardening according to claim 2, further comprising, as the chemical composition, by mass %,
one or two or more of
Ti: 0.005% to 0.2%,
Nb: 0.005% to 0.2%, and
V: 0.005% to 0.35%.

8. The steel for induction hardening according to claim 3, further comprising, as the chemical composition, by mass %,
one or two or more of
Ti: 0.005% to 0.2%,
Nb: 0.005% to 0.2%, and
V: 0.005% to 0.35%.

9. The steel for induction hardening according to claim 2, further comprising, as the chemical composition, by mass %,
one or two or more of
Sb: 0.0003% to 0.015%,
Te: 0.0003% to 0.2%,
Pb: 0.01% to 0.5%, and
Bi: 0.01% to 0.5%.

10. The steel for induction hardening according to claim 3, further comprising, as the chemical composition, by mass %,
one or two or more of
Sb: 0.0003% to 0.015%,
Te: 0.0003% to 0.2%,
Pb: 0.01% to 0.5%, and
Bi: 0.01% to 0.5%.

11. The steel for induction hardening according to claim 4, further comprising, as the chemical composition, by mass %,
one or two or more of
Sb: 0.0003% to 0.015%,
Te: 0.0003% to 0.2%,
Pb: 0.01% to 0.5%, and
Bi: 0.01% to 0.5%.

* * * * *